United States Patent [19]

Sone

[11] 4,365,604

[45] Dec. 28, 1982

[54] SYSTEM FOR FEEDBACK CONTROL OF AIR/FUEL RATIO IN IC ENGINE WITH MEANS TO CONTROL CURRENT SUPPLY TO OXYGEN SENSOR

[75] Inventor: Kohki Sone, Tokyo, Japan

[73] Assignee: Nissan Motor Co., Ltd., Yokohama, Japan

[21] Appl. No.: 231,234

[22] Filed: Feb. 4, 1981

[30] Foreign Application Priority Data

Sep. 8, 1980 [JP] Japan ............................... 55-124378

[51] Int. Cl.[3] ........................ G01N 27/04; F02B 3/00; F02B 3/08; G01N 27/58

[52] U.S. Cl. ................................ 123/440; 204/195 S; 204/1 T

[58] Field of Search .................. 123/440; 60/276, 285; 73/23, 27 R; 204/195 S, 1 S, 1 T

[56] References Cited

U.S. PATENT DOCUMENTS

| | | | |
|---|---|---|---|
| 4,109,615 | 8/1978 | Asano | 123/440 |
| 4,131,089 | 12/1978 | Fujishiro et al. | 123/440 |
| 4,153,023 | 5/1979 | Asano et al. | 123/440 |
| 4,170,965 | 10/1979 | Aono | 123/440 |
| 4,178,793 | 12/1979 | Bremer et al. | 123/440 |
| 4,207,159 | 6/1980 | Kimura et al. | 123/440 |
| 4,214,563 | 7/1980 | Hosaka | 123/440 |
| 4,227,507 | 10/1980 | Takase et al. | 123/440 |
| 4,303,613 | 12/1981 | Yasuda et al. | 123/440 |

FOREIGN PATENT DOCUMENTS

| | | | |
|---|---|---|---|
| 2060177 | 4/1981 | United Kingdom | 123/440 |
| 2062244 | 5/1981 | United Kingdom | 123/440 |

*Primary Examiner*—Raymond A. Nelli
*Attorney, Agent, or Firm*—Schwartz, Jeffery, Schwaab, Mack, Blumenthal & Koch

[57] ABSTRACT

A system for feedback control of air/fuel ratio in an IC engine, utilizing an oxygen-sensitive device which is provided with a heater and disposed in exhaust gas to provide a feedback signal. This device has a porous solid electrolyte layer with a measurement electrode layer on the outside and a reference electrode layer on the inside facing a substrate. The control system includes a sub-system to apply a voltage to the heater and force a DC current to flow through the solid electrolyte layer to cause migration of oxygen ions therethrough to thereby establish a reference oxygen partial pressure on the inner side of the solid electrolyte layer. To prevent great changes in the reference oxygen partial pressure by the influence of the exhaust gas temperature, the sub-system comprises sensors to detect the engine operating condition and control means for gradually varying both said voltage and said current according as the detected operating condition varies. For example, the voltage and current may be varied each by using a combination of a variable resistor and a stepping motor or a combination of fixed resistances and electrically controllable switches connected respectively in parallel with the resistances.

10 Claims, 7 Drawing Figures

SYSTEM FOR FEEDBACK CONTROL OF AIR/FUEL RATIO IN IC ENGINE WITH MEANS TO CONTROL CURRENT SUPPLY TO OXYGEN SENSOR

BACKGROUND OF THE INVENTION

This invention relates to a system for feedback control and air/fuel ratio in an internal combustion engine, which system includes an air/fuel ratio detector having an oxygen-sensitive element of an oxygen concentration cell type disposed in the exhaust gas, provided with an electric heater to ensure proper function of this element and operated with the supply of a DC current to establish a reference oxygen partial pressure in this element, and more particularly to a sub-system to control both the magnitude of a voltage applied to the heater and the intensity of the aforementioned current according to the operating conditions of the engine.

In recent internal combustion engines and particularly in automotive engines, it has become popular to control the air/fuel mixing ratio precisely to a predetermined optimal value by performing feedback control to thereby improve the efficiencies of the engine and reducing the emission of noxious or harmful substances contained in exhaust gases.

For example, in an automotive engine system including a catalytic converter which is provided in the exhaust passage and contains a so-called three-way catalyst that can catalyze both the reduction of nitrogen oxides and oxidation of carbon monoxide and unburned hydrocarbons, it is desirable to control the air/fuel mixing ratio to a stoichiometric ratio because this catalyst exhibits highest conversion efficiencies in an exhaust gas produced by combustion of a stoichiometric air-fuel mixture, and also because the employment of a stoichiometric mixing ratio is favorable for realization of high mechanical and thermal efficiencies of the engine. It has been put into practice to perform feedback control of air/fuel ratio in such an engine system by using a sort of oxygen sensor, which is installed in the exhaust passage upstream of the catalytic converter, as a device that provides an electrical feedback signal indicative of the air/fuel ratio of an air-fuel mixture actually supplied to the engine. Based on this feedback signal, a control circuit commands a fuel-supplying apparatus such as electronically controlled fuel injection valves to control the rate of fuel feed to the engine so as to correct deviations of actual air/fuel ratio from the intended stoichiometric ratio.

Usually the above mentioned oxygen sensor is of an oxygen concentration cell type utilizing an oxygen ion conductive solid electrolyte, such as zirconia stabilized with yttria or calcia. According to a well known design, the sensor is constituted fundamentally of a solid electrolyte layer in the shape of a tube closed at one end and two porous electrode layers formed on the outer and inner surfaces of the solid electrolyte tube, respectively. When there is a difference in oxygen partial pressure between the outer electrode side and inner electrode side of the solid electrolyte layer, this sensor generates an electromotive force between the two electrode layers. As an air/fuel ratio detector for the above-mentioned purpose, the outer electrode layer is exposed to an engine exhaust gas while the inner electrode layer is exposed to atmospheric air utilized as the source of a reference oxygen partial pressure. In this state the magnitude of the electromotive force exhibits a great and sharp change between a maximally high level and a very low level each time when the air/fuel ratio of a mixture supplied to the engine changes across the stoichiometric ratio. Accordingly it is possible to produce a fuel feed rate control signal based on the result of a comparison of the output of the oxygen sensor with a reference voltage which has been set at the middle of the high and low levels of the sensor output.

However, this type of oxygen sensor has disadvantages such as significant temperature dependence of its output characteristics, necessity of using a reference gas such as air, difficulty in reducing the size and insufficiency of mechanical strength.

To eliminate such disadvantages of the conventional oxygen sensor and enable to detect exact air/fuel ratio values for not only a stoichiometric or nearly stoichiometric mixture but also a distinctly non-stoichiometric mixture, U.S. Pat. Nos. 4,207,159 and 4,224,113 disclose an advanced device comprising an oxygen-sensitive element in which an oxygen concentration cell is constituted of a lamination of a flat and microscopically porous layer of a solid electrolyte, a measurement electrode layer porously formed on one side of the solid electrolyte layer and a reference electrode layer formed on the other side, with the provision of a substrate such that the reference electrode layer is tightly sandwiched between the substrate and the solid electrolyte layer and macroscopically shielded from the environmental atmosphere. Each of the three layers on the substrate can be formed as a thin, film-like layer. This device does not use any reference gas. Instead, a DC power supply means is connected to the oxygen-sensitive element so as to force a constant DC current (e.g. of an intensity of about 20 microamperes) to flow through the solid electrolyte layer between the two electrode layers to thereby cause migration of oxygen ions through the solid electrolyte layer in a desired direction and, as a consequence, establish a reference oxygen partial pressure at the interface between the reference electrode layer and the solid electrolyte layer, while the measurement electrode layer is allowed to contact an engine exhaust gas. Where the current is forced to flow in the solid electrolyte from the reference electrode layer towards the measurement electrode layer, there occur ionization of oxygen contained in the exhaust gas at the measurement electrode and migration of negatively charged oxygen ions through the solid electrolyte layer towards the reference electrode. The rate of supply of oxygen in the form of ions to the reference electrode is primarily determined by the intensity of the current. The oxygen ions arrived at the reference electrode layer are deprived of electrons and turn into oxygen molecules to result in accumulation of gaseous oxygen on the reference electrode side of the concentration cell. However, a portion of the accumulated oxygen molecules diffuse outwardly through the microscopical gas passages in the solid electrolyte layer. Therefore, it is possible to maintain a constant and relatively high oxygen partial pressure which serves as a reference oxygen partial pressure on the reference electrode side of the concentration cell by the employment of an appropriate current intensity with due consideration of the microscopical structure and activity of the solid electrolyte layer. Then generated between the reference and measurement electrode layers of this oxygen-sensitive element is an electromotive force of which the magnitude is related to the composition of the exhaust gas and the air/fuel ratio of a mixture from which the exhaust gas is produced. Also it is possible to operate this oxygen-sensitive element by forcing a DC current to flow therein from the measurement electrode layer towards the reference electrode layer. In this case a constant and relatively low oxygen partial pressure can be maintained at the interface between the reference electrode layer and the solid electrolyte layer.

The device according to U.S. Pat. Nos. 4,207,159 and 4,224,113 has advantages such as unnecessity of using any reference gas, excellence in sensitivity or responsiveness, ability of detecting numerical values of air/fuel ratios which may be either above or below a stoichiometric ratio, possibility of producing it into a very small size and good resistance to mechanical shocks and vibrations.

In practical applications it becomes necessary to provide this advanced oxygen-sensitive element (also conventional oxygen sensors of the solid electrolyte concentration cell type) with an electric heater because the activity of the solid electrolyte in the element becomes unsatisfactorily low while the temperature of the element is relatively low, e.g. below about 500° C., so that the element installed in an engine exhaust system becomes ineffective as an air/fuel ratio detecting element while the engine discharges a relatively low temperature exhaust gas if the element should be heated solely by the heat of the exhaust gas. The electric heater is usually attached to, or embedded in, the substrate of the oxygen-sensitive element.

A problem recognized in the applications of the air/fuel ratio detector according to the above quoted U.S. Patents to feedback-type air/fuel ratio control systems for automotive engines is a fact that the magnitude of the above described reference oxygen partial pressure in the oxygen-sensitive element varies considerably under certain operating conditions of the engine even though the intensity of the DC current supplied to the concentration cell part of the element is kept constant. More exactly, the magnitude of the reference oxygen partial pressure is influenced by the temperature of the exhaust gas and the amount of oxygen contained in the exhaust gas.

When the exhaust gas is very high in temperature and considerably low in the concentration of oxygen therein as in the case of the engine being operated under a full-throttle or nearly full-throttle accelerating condition with the feed of a fuel-enriched mixture, the reference oxygen partial pressure (produced by forcing a constant DC current to flow in the solid electrolyte layer towards the measurement electrode layer) lowers greatly and becomes practically zero in an extreme case. Because, although the migration of oxygen ions through the solid electrolyte layer towards the reference electrode layer by the effect of the flow of the constant current continues, the outward diffusion of gaseous oxygen from the reference electrode through the solid electrolyte into the exhaust gas of a low oxygen concentration augments. Therefore, it becomes impossible to continue the feedback control of air/fuel ratio correctly. It is conceivable to suspend the feedback control during operation of the engine under such an extremely high-load condition, but when the control is resumed it takes a relatively long period of time for the lowered reference oxygen partial pressure to recover the initially intended magnitude compared with the frequencies of the feedback signal produced by the air/fuel ratio detector and the control signal provided to the fuel supply apparatus, so that during this time period it becomes impossible to accurately control the air/fuel ratio.

On the contrary, there occurs a great increase in the magnitude of the reference oxygen partial pressure attributed to the flow of the same DC current when the exhaust gas temperature is very low, and particularly when the oxygen concentration in the exhaust gas is considerably high as in the case of a great deceleration of the engine operation with a temporary interruption of the feed of fuel or with the feed of a very lean mixture. The reason is that under such a condition there occurs an increase in the amount of oxygen ions supplied to the reference electrode layer relative to the amount of oxygen molecules diffusing outwardly from the reference electrode through the solid electrolyte layer because of the increased oxygen concentration in the exhaust gas and lowering of the activity of the solid electrolyte by the effect of the lowered exhaust gas temperature. Correct feedback control of air/fuel ratio becomes impossible also in this case. Besides, when the reference oxygen partial pressure continues to augment by this reason beyond a certain critical level, there is a strong possibility of breakage of the oxygen-sensitive element which is constituted fundamentally of relatively thin layers.

SUMMARY OF THE INVENTION

It is an object of the present invention to provide a system for feedback control of air/fuel ratio in an internal combustion engine, which system utilizes an oxygen-sensitive air/fuel ratio detecting probe of the type as disclosed in U.S. Pat. Nos. 4,207,159 and 4,224,113 provided with an electric heater and installed in an exhaust passage and comprises a novel means to maintain a reference oxygen partial pressure established in the oxygen-sensitive probe at an adequate level even though the engine is operated under various load conditions to thereby solve the above described problem involved in the use of the same oxygen-sensitive probe in analogous conventional feedback control systems.

A feedback control system according to the invention comprises an electrically controllable fuel supplying means provided in the intake system of an internal combustion engine; and air/fuel ratio detecting probe which is installed in an exhaust passage for the engine and has an oxygen-sensitive element of a concentration cell type having a substrate, a microscopically porous reference electrode layer laid on the substrate, a microscopically porous layer of an oxygen ion conductive solid electrolyte formed on the substrate so as to cover the reference electrode layer substantially entirely and a microscopically porous measurement electrode layer formed on the solid electrolyte layer and an electric heater; fuel feed control means for providing a control signal to the fuel supplying means to control the rate of fuel feed to the engine so as to maintain a desired air/fuel ratio by utilizing the output of the air/fuel ratio detecting probe as a feedback signal; and power supply means for energizing the electric heater and forcing a DC current to flow through the solid electrolyte layer of the oxygen-sensitive element to cause migration of oxygen ions through the solid electrolyte layer from one of the reference and measurement electrode layers towards the other to thereby establish a reference oxygen partial pressure at the interface between the reference electrode layer and the solid electrolyte layer. According to the invention, this feedback control system further comprises a sub-system to maintain the reference oxygen partial pressure at an adequate level during operation of this control system. This sub-system comprises sensor means for producing at least one electrical information signal each representative of momentary values of a parameter of the operating condition of the engine, which parameter being related also to the temperature of the exhaust gas; and voltage and current control means for gradually varying both the intensity of the DC current to be forced to flow through the solid electrolyte layer and the magnitude of a voltage to be applied to the electric heater according as the operating condition of the engine indicated by said at least one information signal varies to thereby prevent significant changes in the magnitude of the reference oxygen partial pressure by the influence of the exhaust gas temperature.

Preferably the DC current is forced to flow through the solid electrolyte layer from the reference electrode layer towards the measurement electrode layer, and then the voltage and current control means is made to have the function of gradually increasing the intensity of the aforementioned DC current and gradually decreasing the magnitude of the aforementioned voltage according as the operating condition of the engine varies towards high-load conditions to cause the exhaust gas temperature to rise.

It is convenient and preferable to vary the aforementioned current intensity and voltage each by varying the effective resistance value of a circuit connecting a power source to the concentration cell part of the oxygen-sensitive probe or to the heater. For example, use may be made of a combination of a variable resistance and a servomotor such as a stepping motor to move a movable contact of the variable resistance to gradually vary the effective resistance of each circuit. Alternatively, use may be made of a combination of a plurality of fixed resistances and a plurality of electrically controllable switches which are connected respectively in parallel with the fixed resistances to selectively short-circuit a variable number of the fixed resistances.

Since the sub-system according to the invention can vary either practically continuously or stepwise both the intensity of the current forced to flow in the oxygen-sensitive element to establish a reference oxygen partial pressure and the magnitude of the voltage applied to the heater according to the engine operating condition varies, it can effectively be prevented that the reference oxygen pressure in the oxygen-sensitive element becomes very high under low exhaust gas temperature conditions or becomes very low under high exhaust gas temperature conditions. Therefore, the feedback control system according to the invention can perform accurate control of air/fuel ratio over a wide range of engine operating conditions, and the oxygen-sensitive element employed in this system exhibits a sufficiently long service life.

PREFERRED EMBODIMENTS OF THE INVENTION

Figure 1:
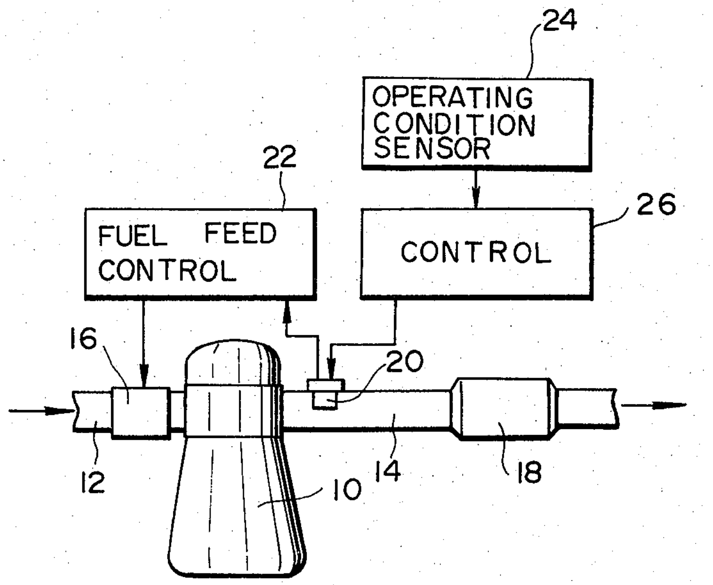
FIG. 1 is a diagrammatic presentation of an internal combustion engine system including an air/fuel ratio control system according to the present invention.

In FIG. 1, reference numeral 10 indicates an automotive internal combustion engine provided with an induction passage 12 and an exhaust passage 14. Indicated at 16 is an electrically controlled fuel-supplying apparatus such as electronically controlled fuel injection valves. As an optional element, a catalytic converter 18 occupies a section of the exhaust passage 14 and contains a conventional three-way catalyst by way of example.

To perform feedback control of the fuel-supplying apparatus 16 with the aim of supplying an optimal air-fuel mixture, in this case a stoichiometric mixture, to the engine 10 during its normal operation for thereby allowing the catalyst in the converter 18 to exhibit its best conversion efficiencies, an air/fuel ratio detecting probe 20 (which is an oxygen sensor in principle) is disposed in the exhaust passage 14 at a section upstream of the catalytic converter 18. An electronic control unit 22 receives the output of the air/fuel ratio detecting probe 20 and provides a control signal to the fuel-supplying apparatus 16 based on the magnitude of a deviation of the actual air/fuel ratio indicated by the output of the probe 20 from the intended air/fuel ratio. As will be illustrated hereinafter, the probe 20 comprises an oxygen-sensitive element of the type requiring the supply of a DC current thereto in order to establish a reference oxygen partial pressure therein, and an electric heater is provided to this element.

According to the present invention, the air/fuel ratio control system of FIG. 1 includes a set of sensors 24 to detect selected parameters of the operating conditions of the engine 10 with a view to estimating momentary temperatures of the exhaust gas at the location of the probe 20 and possibly the level of oxygen concentration in the exhaust gas, too, and a control circuit 26 which receives the operating condition signals from the sensors 24 and regulates both the intensity of a DC current to be supplied to the principal part of the oxygen-sensitive element in the probe 20 and the magnitude of a voltage to be applied to the heater in the same probe 20 according to the engine operating conditions or exhaust gas temperature implied by the received signals. The details of the control circuit 26 will later be described.

Figure 2:
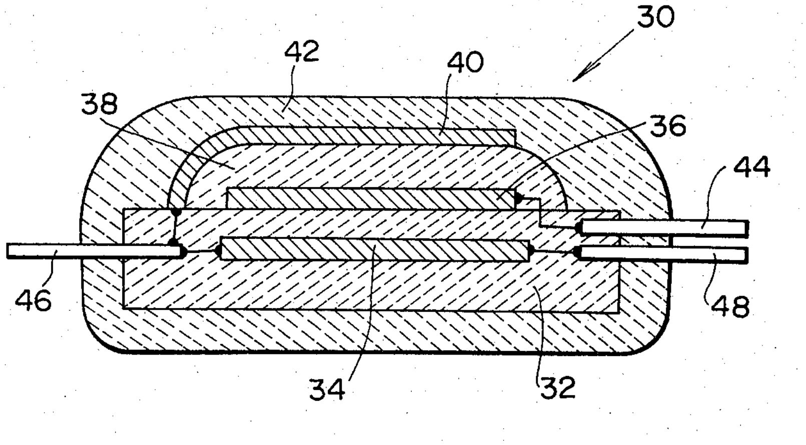
FIG. 2 is a schematic and sectional view of an oxygen-sensitive element of an air/fuel ratio detector employed in the present invention.

FIG. 2 shows an exemplary construction of an oxygen-sensitive element 30 used in the air/fuel ratio detecting probe 20 in the system of FIG. 1. This element 30 is of the type disclosed in U.S. Pat. Nos. 4,207,159 and 4,224,113.

A structurally basic member of this oxygen-sensitive element 30 is a substrate 32 made of a ceramic material such as alumina. A heater element 34 is embedded in the substrate 32 for the reason as described hereinbefore. In practice, this substrate 32 is prepared through face-to-face bonding of two alumina sheets one of which is precedingly provided with the heater element 34 in the form of, for example, a platinum wire or a thin platinum layer of a suitable pattern formed through printing of a platinum paste and sintering of the platinum powder contained in the printed paste. The heater 34 is so designed as to enable to maintain the element 30, when disposed in a combustion gas such as an engine exhaust gas, at a temperature above about 600° C. by the application of an adequate voltage to the heater 34.

An electrode layer 36 called reference electrode layer is formed on a major surface of the substrate 32, and a layer 38 of an oxygen ion conductive solid electrolyte such as $ZrO_2$ stabilized with $Y_2O_3$ is formed on the same side of the substrate 32 so as to cover substantially the entire area of the reference electrode layer 36. Another electrode layer 40 called measurement electrode layer is laid on the outer surface of the solid electrolyte 38. Platinum is a typical example of suitable materials for the two electrode layers 36 and 40.

Each of these three layers 36, 38 40 is a thin, film-like layer (though a "thick layer" in the field of current electronic technology), so that the total thickness of these three layers is only about 50 microns by way of example. Macroscopically the reference electrode layer 36 is completely shielded from an environmental atmosphere by the substrate 32 and the solid electrolyte layer 38. However, both the solid electrolyte layer 38 and the measurement electrode layer 40 (the reference electrode layer 36, too) are miscroscopically porous and permeable to gas molecules.

As is known, these three layers 36, 38, 40 constitute an oxygen concentration cell which generates an electromotive force when there is a difference in oxygen partial pressure between the reference electrode side and the measurement electrode side of the solid electrolyte layer 38. This element 30 is so designed as to establish a reference oxygen partial pressure at the interface between the reference electrode layer 36 and the solid electrolyte layer 38 by externally supplying a DC current to the concentration cell so as to flow through the solid electrolyte layer 38 between the two electrode layers 36, 40, while the measurement electrode layer 40 is exposed to a gas subject to measurement such as an exhaust gas flowing in the exhaust passage 14 in FIG. 1.

Attached to the substrate 32 are three electrical leads 44, 46 and 48. The reference electrode layer 36 and the measurement electrode layer 40 are electrically connected to the lead 44 and the lead 46, respectively. The heater element 34 is connected to the leads 46 and 48, so that the lead 46 serves as a ground terminal common to the heater 34 and the oxygen concentration cell in this element 30. The aforementioned DC current is supplied to the concentration cell so as to flow from the lead 44 to the ground lead 46 through the solid electrolyte layer 38, and an object voltage of this oxygen-sensitive element 30 is measured between these two leads 44 and 46. The output voltage of this element 30 does not strictly accord with the electromotive force generated by the function of this element 30 as a concentration cell but becomes the sum of the electromotive force and a voltage developed across the solid electrolyte layer 38, which has a considerable resistance, by the flow of the DC current therethrough.

Usually the outer surfaces of the concentration cell part, or the entire outer surfaces, of the oxygen-sensitive element 30 are covered with a gas permeably porous protective layer 42 of a ceramic material such as alumina or calcium zirconate.

The principle of the function of this oxygen-sensitive element 30 has already been described in this specification.

Figure 3:
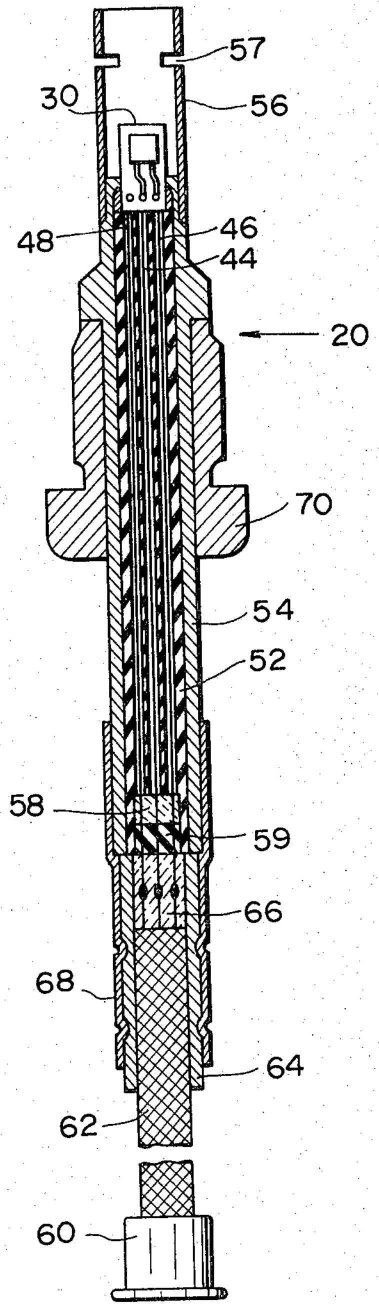
FIG. 3 is a longitudinal sectional view of an air/fuel ratio detecting probe comprising the oxygen-sensitive element of FIG. 2.

The air/fuel ratio detecting probe 20 in FIG. 1 may be constructed as shown in FIG. 3 by way of example. The oxygen-sensitive element 30 of FIG. 2 is fixedly mounted on an end face of a mullite rod 52 having three axial bores through which the leads 44, 46, 48 of the element 30 are extended. The mullite rod 52 is tightly inserted into a tubular holder 54 of stainless steel, and a stainless steel hood 56 formed with apertures 57 is fixed to the forward end of the holder 54 so as to enclose the oxygen-sensitive element 30 therein. A hollow formed in a rear end portion of the mullite rod 52 is filled with alumina powder 58 and a sealant 59. A cable 62 jacketed with a tubular wire braid connects the leads 44, 46, 48 to an electrical connector 60. This cable 62 is fixed to the holder 54 by using a sleeve 64, an insulating sealant 66 and a metal pipe 68. A threaded and flanged nut-like fixture 70 is fixed to the forward side of the holder 54 for attachment of this probe to a boss provided to an exhaust pipe.

Figure 4:
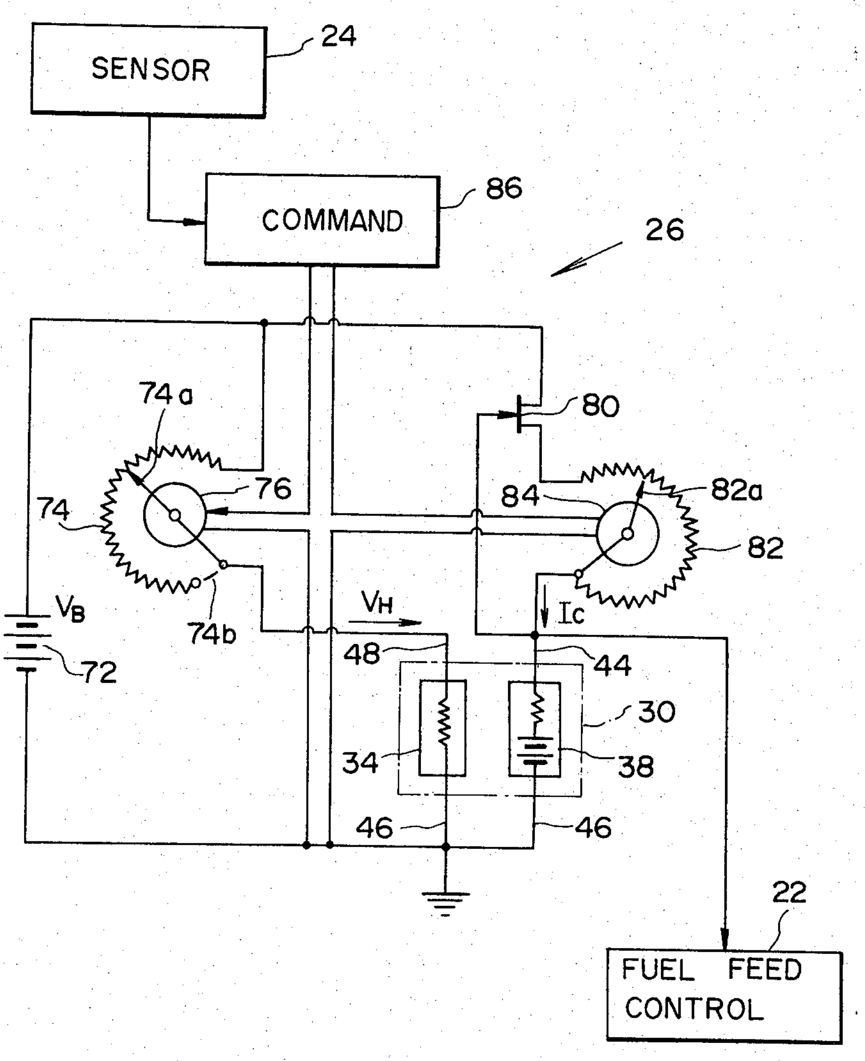
FIG. 4 is a diagrammatic presentation of a voltage and current control system as a sub-system in the air/fuel ratio control system of FIG. 1 and shows an example of voltage- and current-regulating methods suitable to the present invention.

FIG. 4 shows an embodiment of the voltage- and current-control circuit 26 in the system of FIG. 1. In this diagram, the oxygen concentration cell in the oxygen-sensitive element 30 is represented by reference numeral 38 that is assigned to the solid electrolyte layer in FIG. 2.

A DC power source 72 such as a battery in an automobile, of which the voltage is represented by $V_B$, is used to supply a controlled voltage $V_H$ to the heater 34 in the oxygen-sensitive element 30 and a controlled current $I_C$ to the concentration cell 38 in the same element 30.

A variable resistor 74 is connected between and in series with the battery 72 and the lead 48 for the heater 34. The effective resistance of this resistor 74 is determined by the position of a rotatable contact **74*a* which can be rotated anticlockwise in the drawing to gradually increase the effective resistance by a servomotor 76. When the contact 74*a* comes to a terminal 74*b*, the connection between the battery 72 and the heater 34 is broken. The servomotor 76 is driven by a command signal supplied from a command circuit 86, and the operating condition sensors 24 supply their output signals to the command circuit 86**.

A field-effect transistor 80 is used in a known manner to determine a basic level of the DC current $I_C$ to be supplied to the oxygen concentration cell 38. The drain of this FET 80 is connected to the positive terminal of the battery 72, and the source is connected to the lead 44 for the concentration cell 38 via a variable resistor 82. The effective resistance of this resistor 82 is determined by the position of a rotatable contact **82*a* which can be rotated anticlockwise in the drawing to gradually decrease the effective resistance by a servomotor 84. This servomotor 84, too, is driven by a command signal supplied from the command circuit 86**.

As will be understood from the description in the initial part of the present specification, the command circuit 86 so functions as to make small the effective resistance of the variable resistor 74 to thereby augment the heater voltage $V_H$ and at the same time make large the effective resistance of the other variable resistor 82 to thereby decrease the cell-operating current $I_C$ while the signals supplied from the sensors 24 indicate that the engine 10 is operated under such operating conditions as discharges a low temperature exhaust gas. As the exhaust gas temperature estimated from the signals provided by the sensors 24 rises, this circuit 86 commands the servomotor 76 to gradually increase the effective resistance of the variable resistor 74 and the other servomotor 84 to gradually decrease the effective resistance of the other variable resistor 82, so that the heater voltage $V_H$ gradually lowers as the exhaust gas temperature becomes higher, whereas the cell-operating current $I_C$ gradually increases.

Figure 5:
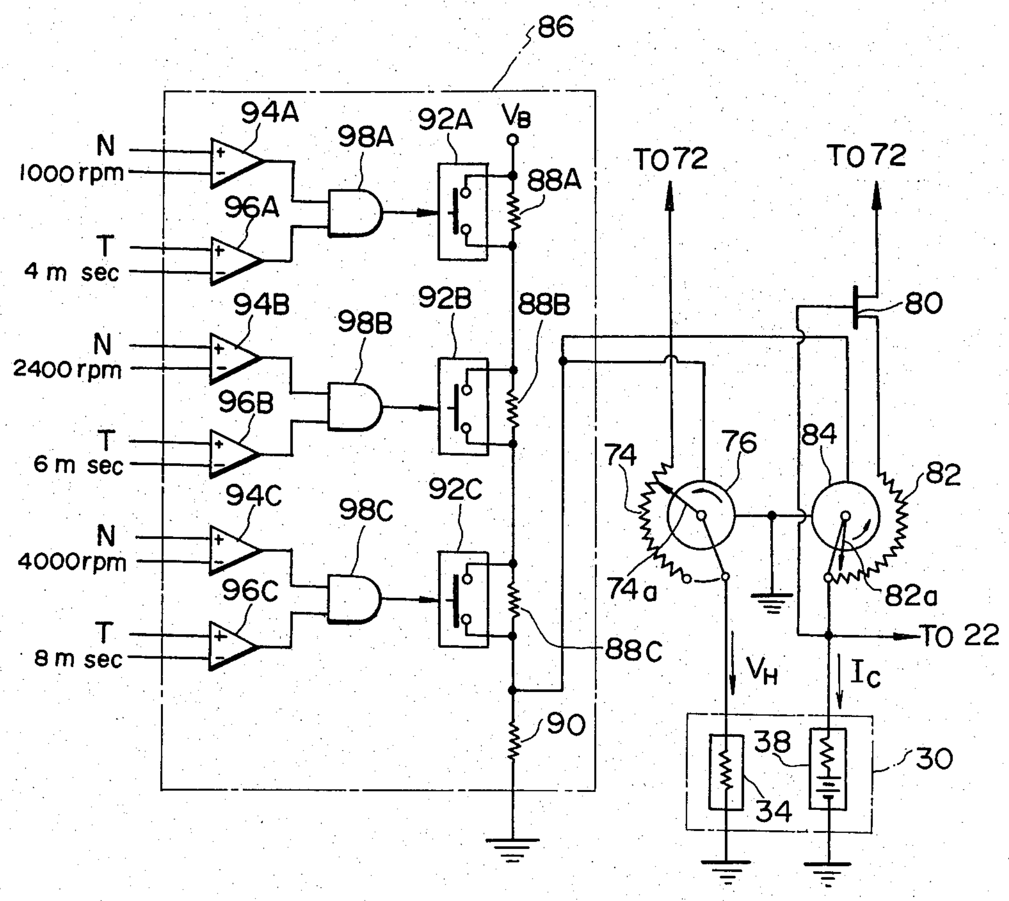
FIG. 5 is a circuit diagram showing an exemplary construction of a control circuit included in the system of FIG. 4.

FIG. 5 shows an example of the construction of the command circuit 86 in FIG. 4, when stepping motors are used as the servomotors 76 and 84.

In this circuit 86 there are four-connected resistances 88A, 88B, 88C and 90 to provide a circuit between a power source of a fixed voltage $V_B$, which may be the battery 72 in FIG. 4, and the ground. To apply a divided voltage to the stepping motors 76 and 84, a junction between the resistances 88C and 90 is connected to the input terminals of these stepping motors 76 and 84. A normally-open and electrically controllable switch 92A such as an electromagnetic relay or a switching transistor is connected in parallel with the resistance 88A. When this switch 92A is closed the resistance 88A becomes ineffectual. Similarly, two normally-open and electrically controllable switches 92B and 92C are connected in parallel with the two resistances 88B and 88C, respectively.

In this case, the operating condition sensors 24 comprise a sensor which produces a signal N representative of the rotational speed of the engine 10 and another sensor which produces a signal T representative of the pulse duration of a pulse signal produced by the control unit 22 in FIG. 1 to control the operation of the fuel injection valves 16. The command circuit 86 has three comparators 94A, 94B and 94C each of which makes a comparison between the engine speed signal N and a predetermined rotational speed, which is 1000 rpm in the first comparator 94A, 2400 rpm in the second comparator 94B and 4000 rpm in the third comparator 94C, and puts out a logic "1" signal only when the engine speed represented by the signal N is greater than the predetermined speed. There are three more comparators 96A, 96B and 96C each of which makes a comparison between the pulse duration signal T and a predetermined duration, which is 4 ms in the fourth comparator 96A, 6 ms in the fifth comparator 96B and 8 ms in the sixth comparator 96C, and puts out a logic "1" signal only when the duration represented by the signal T is greater than the predetermined duration.

A first AND gate 98A is connected to the output terminals of the first and fourth comparators 94A and 96A to put out a signal that causes the first switch 92A to take the on-state only when these two comparators 94A and 96A put out logic "1" signals simultaneously. A second AND gate 98B is connected to the second and fifth comparators 94B and 96B to put out a signal that causes the second switch 92B to close when these two comparators 94B and 96B put out logic "1" signals simultaneously. Similarly, a third AND gate 98C causes the third switch 92C to close when the third and sixth comparators 94C and 96C put out logic "1" signals simultaneously.

While the signal N indicates an engine speed lower than 1000 rpm the three switches 92A, 92B, 92C all remain open, so that the magnitude of the voltage applied to the stepping motors 76 and 84 minimizes. Accordingly the effective resistance of the variable resistor 74 becomes minimum to make the magnitude of the heater voltage $V_H$ maximum, whereas the effective resistance of the other variable resistance 82 becomes maximum to make the intensity of the cell-operating current $I_C$ minimum. When, for example, the signal indicates an engine speed of 1500 rpm and a pulse duration of 5 ms, the resistance 88A becomes short-circuited by the closed first switch 92A, but the resistances 88B and 88C remain effectual. Accordingly each of the two stepping motors 76 and 84 makes a definite angular motion to result in a definite increase in the effective resistance of the variable resistor 74 with a corresponding lowering of the heater voltage $V_H$ and a definite decrease in the effective resistance of the other variable resistor 82 with a corresponding increase in the cell-operating current $I_C$. When the signal N indicates an engine speed greater than 4000 rpm and the signal T indicates a pulse duration greater than 8 ms the three resistances 88A, 88B and 88C all become short-circuited, so that the heater voltage $V_H$ is minimized whereas the cell-controlling circuit $I_C$ is maximized. Thus, both the heater voltage $V_H$ and the cell-operating current $I_C$ are varied stepwise depending on the values of the detected parameters of the engine operating condition, which values are indicative of the temperature of the exhaust gas and even the oxygen concentration in the exhaust gas.

Figure 6:
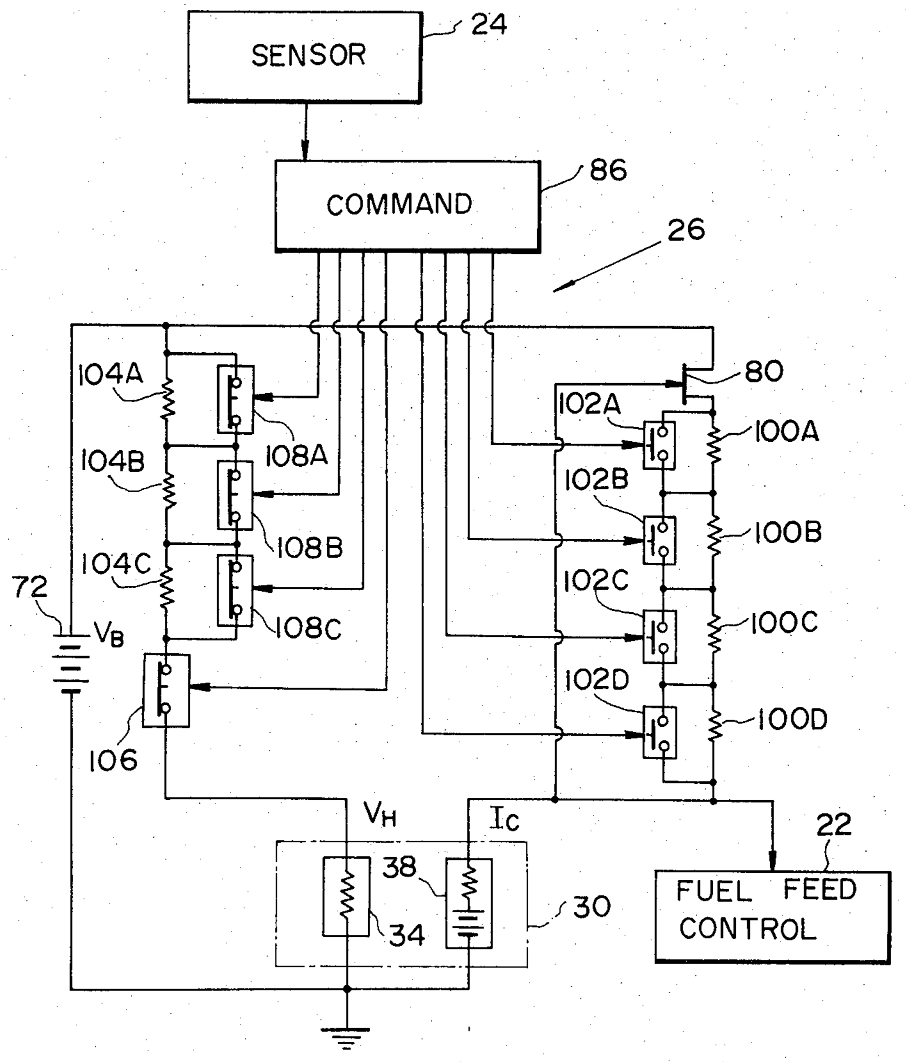
FIG. 6 is a diagrammatic presentation of a voltage and current control system as a sub-system in the air/fuel ratio control system of FIG. 1 and shows another example of voltage- and current-regulating methods suitable to the present invention.

FIG. 6 shows another embodiment of the control circuit 26 in FIG. 1.

Also in this case the FET 80 is used to determine a basic level of the cell-controlling current $I_C$, but the source of the FET 80 is connected to the cell 38 via four series-connected resistances 100A, 100B, 100C and 100D, and four normally-open and electrically controllable switches 102A, 102B, 102C and 102D are connected respectively in parallel with the four resistances 100A, 100B, 100C and 100D. Each of these switches 102A to 102D becomes closed in response to a specific signal supplied from the command circuit 86 to short-circuit the associated one of the four resistances 100A to 100D. The command circuit 86 so functions as to increase the proportion of the short-circuited resistances in these four resistances 100A to 100D as the exhaust gas temperature implied by the signals supplied from the sensors 24 becomes higher to thereby increase the cell-operating current $I_C$ stepwise.

The battery 72 is connected to the heater 34 via three resistances 104A, 104B, 104C and a normally-closed and electrically controllable switch 106 all connected in series. Three normally-closed and electrically controllable switches 108A, 108B, 108C are connected respectively in parallel with the three resistances 104A, 104B, 104C, so that these resistances 104A, 104B, 104C are all short-circuited. However, each of the three switches 108A, 108B, 108C becomes opens in response to a specific signal supplied from the command circuit 86 to release the associated one of the three resistances 104A, 104B, 104C from the short-circuited state. The command circuit 86 so functions as to keep the four switches 106, 108A, 108B, 108C closed while the exhaust gas temperature is very low to thereby maximize the heater voltage $V_H$ and decrease the proportion of the short-circuited resistances in the three resistances 104A, 104B, 104C as the exhaust gas temperature implied by the signals supplied from the sensors 24 becomes higher to thereby lower the heater voltage $V_H$ stepwise. When the exhaust gas temperature is exceedingly high, the command circuit 86 commands the switch 106 to open to thereby interrupt the application of heater voltage $V_H$ to the heater 34.

Figure 7:
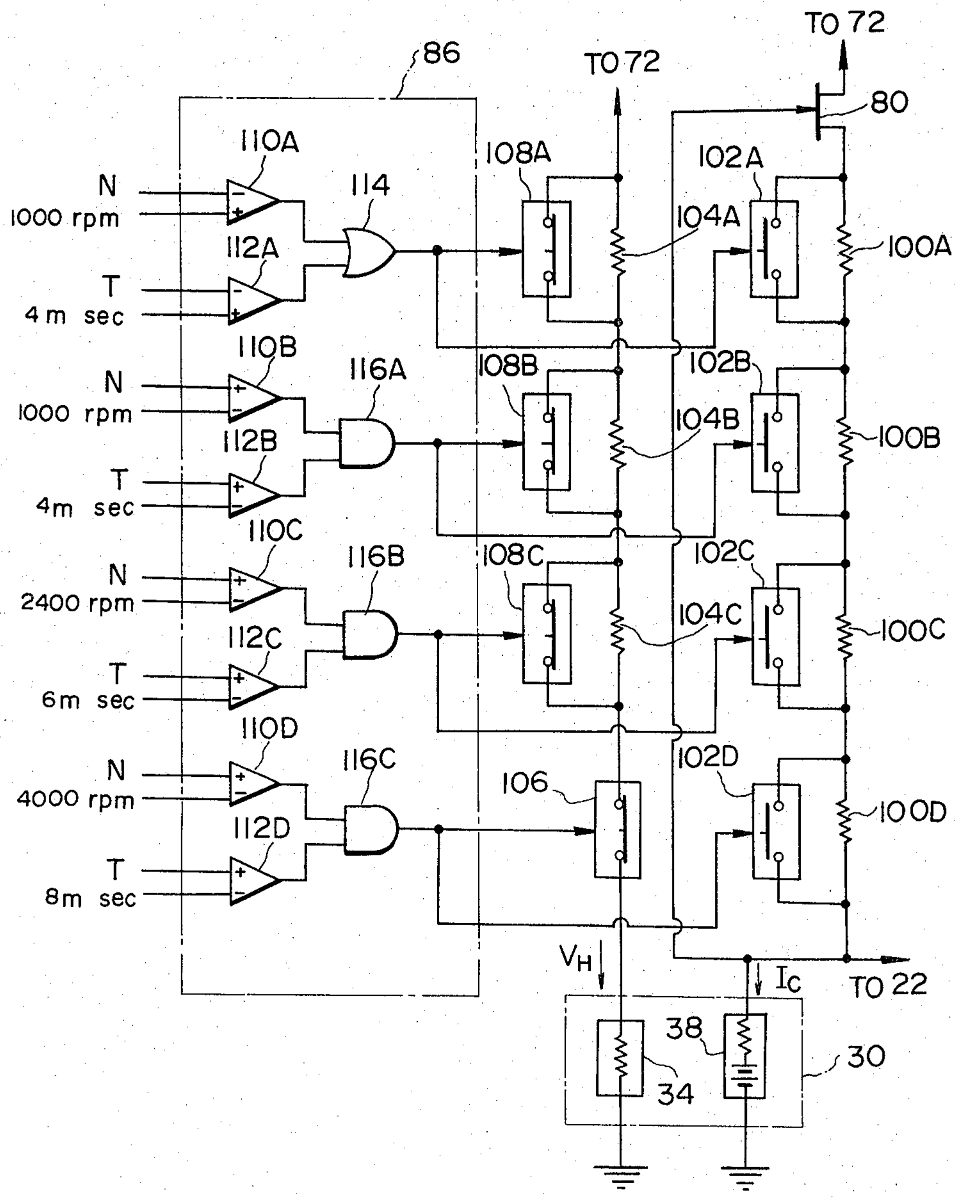
FIG. 7 is a circuit diagram showing an exemplary construction of a control circuit included in the system of FIG. 6.

FIG. 7 shows an example of the construction of the command circuit 86 in the voltage- and current-control circuit 26 in FIG. 6.

Also in this case the operating condition sensors 24 comprise the sensor which produces the aforementioned engine speed signal N and the sensor which produces the aforementioned pulse duration signal T.

In this case the command circuit 86 has comparators 110A, 110B, 110C and 110D. The first comparator 110A makes a comparison between the engine speed signal N and a predetermined rotational speed, 1000 rpm in this example, and puts out a logic "1" signal only when the speed indicated by the signal N is lower than 1000 rpm. Each of the second, third and fourth comparators 110B, 110C, 110D makes a comparison between the signal N and a predetermined rotational speed, which is 1000 rpm in the second comparator 110B, 2400 rpm in the third comparator 110C and 4000 rpm in the fourth comparator 110D, and puts out a logic "1" signal only when the speed indicated by the signal N is greater than the predetermined speed. There are four more comparators 112A, 112B, 112C and 112D. The fifth comparator 112A makes a comparison between the pulse duration signal T and a predetermined duration, 4 ms in this example, and puts out a logic "1" signal only when the duration indicated by the signal T is smaller than 4 ms. Each of the sixth, seventh and eighth comparators 112B, 112C, 112D makes a comparison between the signal T and a predetermined duration, which is 4 ms in the sixth comparator 112B, 6 ms in the seventh comparator 112C and 8 ms in the eighth comparator 112D, and puts out a logic "1" signal when the pulse duration indicated by the signal T is greater than the predetermined duration.

An OR gate 114 is connected to the output terminals of the first and fifth comparators 110A and 112A to put out a signal that causes the first normally-open switch 102A to close and at the same time the first normally-closed switch 108A to open when either of these two comparators 110A, 112A puts out a logic "1" signal. Then the resistance 100A to vary the cell-operating current $I_C$ becomes short-circuited, and the resistance 104A to vary the heater voltage $V_H$ becomes effectual.

A first AND gate 116A is connected to the output terminals of the second and sixth comparators 110B and 112B to put out a signal that causes the second normally-open switch 102B to close and at the same time the second normally-closed switch 108B to open when these two comparators 110B and 112B put out logic "1" signals simultaneously. A second AND gate 116B puts out a signal that causes closing of the third normally-open switch 102C and opening of the third normally-closed switch 108C when the third and seventh comparators 110C and 112C put out logic "1" signals simultaneously. Similarly, a third AND gate 116C causes closing of the fourth normally-open switch 102D and opening of the normally-closed switch 106 when these two comparators 110D and 112D put out logic "1" signals simultaneously.

Thus, the command circuit 86 of FIG. 7 has the function of short-circuiting the resistances 100A to 100D one by one as the exhaust gas temperature becomes higher thereby increasing the current $I_C$ stepwise and at the same time releasing the resistances 104A, 104B, 104C from the short-circuited state one by one thereby lowering the heater voltage $V_H$ stepwise.

Either electromagnetic relays or semiconductor switches such as switching transistors may be used as the electrically controllable switches in FIGS. 6 and 7. By using semiconductor switches, the voltage- and current-controlling circuit of FIGS. 6 and 7 becomes superior in the quickness of response and therefore in the accuracy of the control to the circuit of FIGS. 4 and 5 comprising stepping motors.

In the above examples, the operating condition sensors 24 were described as to detect the rotational speed of the engine and the pulse duration of a fuel injection control signal, but this is not limitative. Other than these two parameters, at least one of other parameters such as the magnitude of intake vacuum, the degree of opening of a main throttle valve and the flow rate of air drawn into the induction passage may be detected and utilized in the command circuit 86.

What is claimed is:

1. In a system for feedback control of the air/fuel ratio of an air-fuel mixture supplied to an internal combustion engine, the control system having: an electrically controllable fuel supplying means provided in the intake system of the engine; an air/fuel ratio detecting probe which is installed in an exhaust passage for the engine and has an oxygen-sensitive element of a concentration cell type having a substrate, a reference electrode layer laid on the substrate, a microscopically porous layer of an oxygen ion conductive solid electrolyte formed on the substrate so as to cover the reference electrode layer substantially entirely and a microscopically porous measurement electrode layer formed on the solid electrolyte layer and an electric heater; fuel feed control means for providing a control signal to the fuel supplying means to control the rate of fuel feed to the engine so as to maintain a desired air/fuel ratio by utilizing the output of the air/fuel ratio detecting probe as a feedback signal; and power supply means for energizing the electric heater and forcing a DC current to flow through the solid electrolyte layer of the oxygen-sensitive element to cause migration of oxygen ions through the solid electrolyte layer from one of the reference and measurement electrode layers towards the other to thereby establish a reference oxygen partial pressure at the interface between the reference electrode layer and the solid electrolyte layer;

the improvement comprising a sub-system to maintain said reference oxygen partial pressure at an adequate level during operation of the feedback control system, said sub-system comprising: sensor means for producing at least one electrical information signal each representative of momentary values of a parameter of the operating condition of the engine, said parameter being related also to the temperature of the exhaust gas; and voltage and current control means for gradually varying both the intensity of said DC current to be forced to flow through said solid electrolyte layer and the magnitude of a voltage to be applied to said electric heater according as the operating condition of the engine indicated by said at least one information signal varies to thereby prevent significant changes in the magnitude of said reference oxygen partial pressure by the influence of the exhaust gas temperature.

2. A feedback control system according to claim 1, wherein said DC current is forced to flow through said solid electrolyte layer from said reference electrode layer towards said measurement electrode layer, said voltage and current control means having the function of gradually increasing the intensity of said DC current and gradually decreasing the magnitude of said voltage according as the operating condition of the engine varies in such a way as causes the exhaust gas temperature to rise.

3. A feedback control system according to claims 1 or 2, wherein said voltage and current control means comprises a first resistance circuit which is connected between a DC power source and said oxygen-sensitive element to determine the intensity of said DC current, means for gradually varying the total resistance value of said first resistance circuit in response to said at least one information signal, a second resistance circuit connected between a DC power source and said electric heater, and means for gradually varying the total resistance value of said second resistance circuit in response to said at least one information signal.

4. A feedback control system according to claim 3, wherein each of said first and second resistance circuits comprises a variable resistance, each of said first and second means comprising a servomotor which is associated with said variable resistance so as to vary the effective resistance of said variable resistance in response to a drive signal produced by said voltage and current control means based on said at least one information signal.

5. A feedback control system according to claim 3, wherein each of said first and second resistance circuits comprises a plurality of fixed resistances and a plurality of electrically controllable switches connected respectively in parallel with said fixed resistances, said voltage and current control means having the function of selectively opening and closing said switches of said first and second resistance circuits in response to said at least one information signal to thereby vary the proportion of the short-circuited portion of said fixed resistances of each of said first and second resistance circuits.

6. A feedback control system according to claim 2, wherein said voltage and current control means comprises: a first variable resistor which has a rotatable contact to vary the effective resistance thereof and is connected between a DC power source and said reference electrode layer; a first stepping motor arranged to rotate said rotatable contact of said variable resistor stepwise; a second variable resistor which has a rotatable contact and is connected between a DC power source and said heater; a second stepping motor arranged to rotate said rotatable contact of said second variable resistor; and a command circuit which produces a drive signal which causes each of said first and second stepping motors to make a definite angular motion each time when one of predetermined changes occurs in the operating condition of the engine indicated by said at least one information signal.

7. A feedback control system according to claim 6, wherein said command circuit comprises a voltage-dividing circuit which has a plurality of resistances all connected in series, a plurality of electrically controllable switches connected respectively in parallel with said plurality of resistances, and logic means for selectively closing a selected number of said plurality of resistances based on the operating condition of the engine indicated by said at least one information signal to produce said command signal as a change in the magnitude of a voltage applied to said first and second stepping motors through said voltage-dividing circuit.

8. A feedback control system according to claim 7, wherein said at least one information signal comprises an engine speed signal and a fuel feed rate signal, said logic means comprising a plurality of first comparators each of which puts out a specific logic signal when the high-low relation between the engine speed indicated by said engine speed signal and a reference speed predetermined for each of said first comparators is as prescribed, a plurality of second comparators each of which puts out a specific logic signal when the high-low relation between the rate of fuel feed to the engine indicated by said fuel feed rate signal and a reference feed rate predetermined for each of said second comparators is as prescribed, and a plurality of logic gates each of which causes one of said switches to open or close depending on the outputs of definite one of said first comparators and definite one of said secod comparators.

9. A feedback control system according to claim 2, wherein said voltage and current control means comprises: a plurality of first resistances all connected in series between a DC power source and said reference electrode layer; a plurality of normally-open and electrically controllable first switches connected respectively in parallel with said first resistances; a plurality of second resistances all connected in series between a power source and said heater; a plurality of normally-closed and electrically controllable second switches connected respectively in parallel with said second resistances; and a command circuit which produces a command signal which causes one of said first switches to close and one of said second switches to open each time when one of predetermined changes occurs in the operating condition of the engine indicated by said at least one information signal.

10. A feedback control system according to claim 9, wherein said at least one information signal comprises an engine speed signal and a fuel feed rate signal, said command circuit comprising a plurality of first comparators each of which puts out a specific logic signal when the high-low relation between the engine speed indicated by said engine speed signal and a reference speed predetermined for each of said first comparators is as prescribed, a plurality of second comparators each of which puts out a specific logic signal when the high-low relation between the rate of fuel feed to the engine indicated by said fuel feed rate signal and a reference feed rate predetermined for each of said second comparators is as prescribed, and a plurality of logic gates each of which provides said command signal to one of said first switches and one of said second switches based on the outputs of definite one of said first comparators and definite one of said second comparators.

* * * * *